(12) United States Patent
Fujita et al.

(10) Patent No.: US 8,122,458 B2
(45) Date of Patent: Feb. 21, 2012

(54) DEVICE COMMUNICATION INTERFACE SYSTEM

(75) Inventors: Takeshi Fujita, Tokyo (JP); Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1127 days.

(21) Appl. No.: 11/943,233

(22) Filed: Nov. 20, 2007

(65) Prior Publication Data

US 2008/0127226 A1 May 29, 2008

(30) Foreign Application Priority Data

Nov. 27, 2006 (JP) .................... 2006-319352

(51) Int. Cl.
G06F 3/00 (2006.01)
(52) U.S. Cl. ........................................... 719/327
(58) Field of Classification Search .............. 719/321, 719/327
See application file for complete search history.

(56) References Cited

U.S. PATENT DOCUMENTS

| 5,978,815 | A * | 11/1999 | Cabrera et al. .................... 1/1 |
| 6,339,795 | B1 * | 1/2002 | Narurkar et al. ............. 709/246 |
| 2005/0081044 | A1 * | 4/2005 | Giles et al. .................... 713/182 |
| 2005/0289177 | A1 * | 12/2005 | Hohmann et al. ........ 707/103 R |

OTHER PUBLICATIONS

Kevin Fall, Exploiting In-Kernel Data Paths to Improve I/O Throughput and CPU Availability, 1992.*

* cited by examiner

*Primary Examiner* — Lechi Truong
(74) *Attorney, Agent, or Firm* — K&L Gates LLP

(57) ABSTRACT

The device communication interface obtains a device driver corresponding to a device connected to the input and output interface from a server on a communication network via a communication interface, and outputs information, which is input via the input and output interface and the device driver from the device, via the communication interface to the server on the communication network, and/or outputs information, which is received via the communication interface from a server on the communication network, via the device driver and the input and output interface to the device.

6 Claims, 5 Drawing Sheets

FIG. 3

| INPUT-SIDE APPARATUS UNIQUE ID | OUTPUT-SIDE APPARATUS UNIQUE ID |
|---|---|
| dev4329 | dev4310 |
| dev8201 | dev8209 |
| ⋮ | ⋮ |

FIG. 4

| DEVICE COMMUNICATION INTERFACE APPARATUS UNIQUE ID | PERMITTED USER'S ID |
|---|---|
| dev4329 | bx82719 |
| dev4310 | bx82719 |
| dev8201 | fx00081 |
| | fx08166 |
| dev8209 | fx00081 |
| | fx08166 |
| dev8300 | fx08166 |

| DEVICE COMMUNICATION INTERFACE APPARATUS UNIQUE ID | OWNER ID | PERMITTED USER'S ID |
|---|---|---|
| dev4329 | bx82719 | bx82719 |
| dev4310 | bx82719 | bx82719 |
| dev8201 | fx00081 | fx00081 |
|  |  | fx08166 |
| dev8209 | fx00081 | fx00081 |
|  |  | fx08166 |
| dev8300 | fx08166 | fx08166 |

DEVICE COMMUNICATION INTERFACE SYSTEM

TECHNICAL FIELD

The present invention relates to a device communication interface system.

BACKGROUND TECHNOLOGY

Keyboards, monitor displays and other devices for PCs are connected to device interfaces placed in PC bodies itself. In the PC bodies, device drivers compatible with an OS (operating system) are stored in advance. By using these device drivers, a processing device in a PC body can obtain input from an input device and can provide output to an output device.

However, this causes a problem that a lot of resources are required when a plural of device drivers for devices connected to the PC are stored in local resources in advance. Moreover, if a complete set of hardware including the PC itself, input device and output device is not prepared, a user of the PC can not utilize the PC.

An apparatus called a USB (universal serial bus) device server has been developed. The USB device server enables a plurality of PCs to share input devices and output devices (see, for example, non-patent document 1).

The USB device server is connected to a local area network (LAN) and is recognized as a virtual USB port by client PCs connected to the same LAN. Through this virtual USB port, the client PCs connected to the LAN can share a variety of USB devices connected to the USB device server. Thus, there is no need to prepare the same input and output devices for each PC. Non-patent document 1: Silex Technology, INC., "What is USB Device Server?", online document, date of posting unknown, [searched on a Nov. 14, 2006] on the Internet.

OBJECT OF THE INVENTION

However, even if using this USB device server, a client PC user still must prepare a PC body in his/her local area. The client PC user must install an environment for using the USB device server on the client PC in order to make the PC recognize the USB device server as a virtual USB port. Moreover, the client PC recognizes a USB device server as a virtual USB port, so that, in order to use input and output devices connected to the USB device server, drivers for the input and output devices must be installed on local resources in each client PC in a conventional manner.

It is an object of the present invention to solve the problems of the above-described technology, and to provide an environment as follows. A user using input and output devices does not have to prepare a computer in the same area as the local area located the input and output devices. Moreover, when a user uses input and output devices, the user is not required to install device drivers on an apparatus to which the input and output devices are directly connected.

SUMMARY OF THE INVENTION

The present invention is configured as follows to resolve the above problems.

The device communication interface apparatus of the present invention comprises an input and output interface to be connected to a device, a communication interface that connects via a cable or wirelessly to a communication network and communicates with a server on the communication network, a memory that stores a device driver, and a processor. The processor has a device driver acquisition function for starting the device driver corresponding to a device connected to the input and output interface, a network communication function for transmitting/receiving information via the communication interface to/from a server on the communication network, and a device input and output function for either outputting information, which is input via the input and output interface and the device driver from the device, via the communication interface to the server on the communication network, or outputting information, which is received via the communication interface from a server on the communication network, via the device driver and the input and output interface to the device.

The device communication interface apparatus of the present invention may also be configured as follows. If a device driver corresponding to a device connected to the input and output interface has not been stored in memory, the processor obtains the device driver from a server on the communication network via the communication interface.

The device communication interface apparatus of the present invention may also be configured as follows. The processor, in the network communication function, attaches identification information unique to the device onto information to be transmitted to the server. The identification information is obtained from the device.

A mobile terminal of the present invention comprises an input and output interface to be connected to a device, a communication interface that connects via a cable or wirelessly to a communication network and communicates with a server on the communication network, a memory that stores a device driver, and a processor. The processor has a device driver acquisition function for starting the device driver corresponding to a device connected to the input and output interface, a network communication function for transmitting/receiving information via the communication interface to/from a server on the communication network, and a device input and output function for either outputting information, which is input via the input and output interface and the device driver from the device, via the communication interface to the server on the communication network, or outputting information, which is received via the communication interface from a server on the communication network, via the device driver and the input and output interface to the device.

A mobile terminal of the present invention comprises an input device, an output device and a device communication interface apparatus. The device communication interface apparatus comprises an input and output interface to be connected to the input device or the output device, a communication interface that connects via a cable or wirelessly to a communication network and communicates with a server on the communication network, a memory that stores a device driver, and a processor having a function for starting the device driver corresponding to a device connected to the input and output interface, a network communication function for transmitting/receiving information via the communication interface to/from a server on the communication network, and a device input and output function for either outputting information, which is input via the input and output interface and the device driver from the device, via the communication interface to the server on the communication network, or outputting information, which is received via the communication interface from a server on the communication network, via the device driver and the input and output interface to the device.

The mobile terminal of the present invention may also be configured as follows. If a device driver corresponding to a device connected to the input and output interface has not been stored in the memory, the processor obtains the device driver from a server on the communication network via the communication interface.

The information processing server of the present invention comprises communication means for carrying out communications, via a communication network, with a first device communication interface apparatus to which an input device is connected, and a second communication interface device to which an output device is connected; storage means for storing an identifier for identifying the first device communication interface apparatus and an identifier associated for identifying the second device communication interface apparatus as being associated with each other; and a computer that performs information processing based on input information received from the first device communication interface apparatus, reads from storage means the identifier of the second device communication interface associated with the first device communication interface that transmitted the input information, and transmits result of the information processing to the output-side apparatus of the read identifier.

The information processing server of the present invention may also be configured as follows. The storage means stores an identifier for indicating a user permitted to use a device communication interface apparatus and an identifier of the device communication interface apparatus as being associated with each other, and stores an identifier that identifies the first device communication interface apparatus and an identifier identifying the second device communication interface apparatus as being associated with each other, where in a combination of the two device communication interface apparatuses that a user is permitted to use, one is considered to be the first device communication interface apparatus and the other is considered to be the second device communication interface apparatus.

EFFECTS OF THE INVENTION

The present invention has the configurations and functions as described above, therefore, because information processing is delegated to an information processing server on a communication network, a user of input and output devices does not have to prepare a local computer to use the devices. Further, because a device driver acquisition function is utilized, the user is not required to work for installing device drivers on an apparatus to which the input and output devices are directly connected.

BRIEF DESCRIPTION OF THE DRAWINGS

FIG. 3 is a diagram showing one example of a table that includes the correspondence between input-side apparatus unique IDs and output-side apparatus unique IDs in the first embodiment;

FIG. 4 is a diagram showing one example of a table that includes correspondence between unique IDs of device communication interface apparatus and user IDs of users who can use a device communication interface apparatus in a second embodiment; and FIG. 5 is a diagram showing one example of a table that includes correspondence among device communication interface apparatus unique IDs, owner IDs of owners of the apparatuses, and user IDs of users permitted to the device communication interface apparatuses in a third embodiment.

LEGENDS

Figure 1:
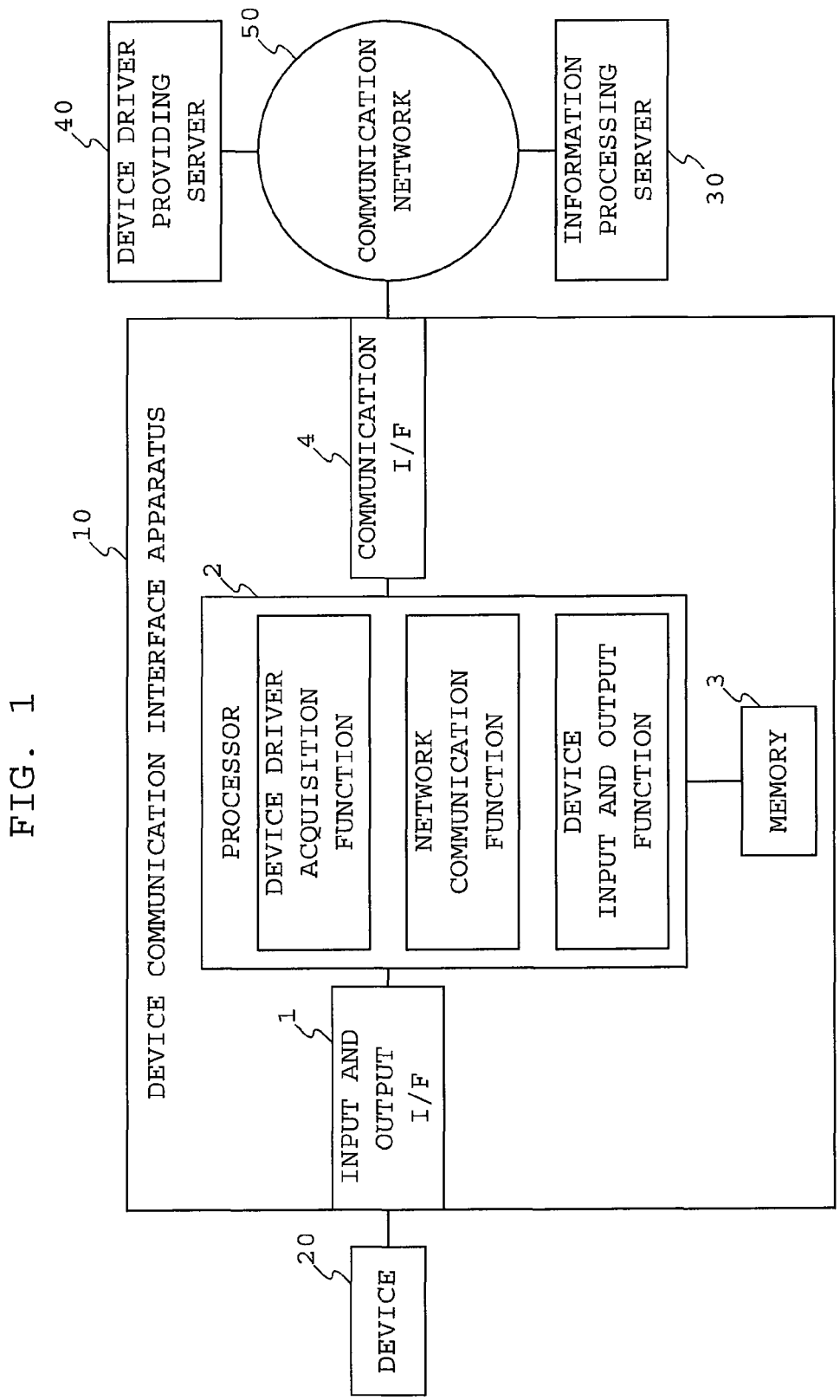
FIG. 1 is a block diagram showing the configuration of a first embodiment of the present invention.

1: input and output interface
2: processor
3: memory
4: communication interface
10, 10a, 10b: device communication interface apparatuses
20, 20a, 20b: devices
30: information processing server
40: device driver providing server
50: communication network

DETAILED DESCRIPTION OF THE INVENTION

Embodiments of the present invention will be explained with reference to the drawings.

First Embodiment (1) Device Constitution

FIG. 1 shows the configuration of a device communication interface apparatus 10 according to a first embodiment of the present invention. The device communication interface apparatus 10 comprises an input and output interface 1 to be connected to an external device 20. The input and output interface 1 comprises a connector compatible with a connector specification of the device 20. The input and output interface 1 is connected to a processor 2. The processor 2 is prepared as, for example, an application-specific integrated circuit (ASIC), and has a device driver acquisition function, a network communication function and a device input and output function.

The device driver acquisition function is a function to acquire a device driver from a server on a communication network 50 for the device 20 connected to the input and output interface 1. In the present embodiment, the device driver acquisition function determines whether a device driver corresponding to a device connected to the input and output interface has been stored in a memory, and if it is determined that any device drivers for the device have not been stored in the memory, acquires the device driver via the communication interface from a server on the communication network. Further, the network communication function is a function to transmit/receive information to/from a server on the communication network in accordance with network communication protocols. The device input and output function is a function for outputting information input from the input device 20 via the device driver to a server on the communication network 50, or outputting information received from a server on the communication network 50 to the output device 20 via the device driver.

A memory 3 and a communication interface 4 are connected to the processor 2. The memory 3 stores minimal programs required for the processor 2 to function, device drivers stored in advance for devices with a high probability of being connected to the input and output interface 1, and device drivers obtained from a server on the communication network 50. The communication interface 4 is connected via cable or wirelessly to the communication network 50, and carries out communication with a server on the communication network 50. In the present embodiment, the communication interface 4 is connected to the Internet via a LAN (local area network), and carries out HTTP communication with a server on the Internet.

An information processing server 30 that performs predetermined information processing based on input information and outputs the processing result, and a device driver providing server 40 that provides device drivers for devices 20, are connected to the communication network 50.

The information processing server 30 comprises a communication device such as a network interface card, a modem, and the like connectable to a computer network for an example of communication means, a computer that executes the processing described below, and storage means for storing various tables described below and data to be transmitted/received in communications with the device communication interface apparatus 10. As the storage means, a semiconductor memory, a hard disk drive, a disk array, or the like can be used.

(2) Product Summary

The device communication interface apparatus 10 according to the present embodiment can be incorporated in a housing small enough to fit in a palm of a hand, and is thus easily carried. Alternatively, the apparatus may also be incorporated as an additional feature in a mobile terminal such as mobile telephone or the like. Power sources may be established by supplying from an internal battery, by supplying from an attached external power source such as an AC adaptor or the like, or by supplying USB (universal serial bus) bus power. A user connects this small device communication interface apparatus 10 to a LAN environment via cable or wirelessly, and further connects a familiar keyboard or other device to the device communication interface apparatus 10. The device driver corresponding to the connected device is then read from the memory or downloaded from a server, so that the device is ready to be used. For example, in a case where the device is an input device, when a user inputs information through the device, the input information is delivered as-is to the information processing server 30 on the communication network 50 such as the Internet and the information processing server 30 performs the predetermined information processing. In a case where the connected device is an output device, the device communication interface apparatus 10 obtains information processing result from the information processing server 30, and outputs the same to the output device. A user, with only the device communication interface apparatus 10 and a connected device, can use the server-based information processing environment anywhere.

(3) Apparatus Operations

Next, operations of the device communication interface apparatus 10 will be explained with reference to FIG. 1. Upon activation of the device communication interface apparatus 10, the processor 2 first starts a device driver acquisition function. The device driver acquisition function obtains type information of a device 20 connected to the input and output interface 1 is obtained from the device 20, and based on the type information of the device 20, determines whether a device driver corresponding to the device 20 has been stored in the memory 3.

If it is determined that a device driver corresponding to the device 20 has been stored in the memory 3, the device driver acquisition function reads and starts the device driver corresponding to the device 20 stored in the memory 3.

On the other hand, if it is determined that a device driver corresponding to the device 20 has not been stored in the memory 3, a device driver corresponding to the device 20 is obtained from a server on the communication network via the communication interface 4, and stored in the memory 3.

At that time, the processor 2 uses the network communication function. By the network communication function, a communication connection is established with the device driver providing server 40 on the communication network 50 via the communication interface 4. The network address of the device driver providing server 40 has been stored in advance in the memory 3. There are several conceivable methods for acquiring the network address of the device driver providing server 40. The method may be one that the address is stored in memory when the product is manufactured, that the address is set by using the external device 20, that the address is acquired via the communication network and stored the same in memory, or the like.

With the device driver acquisition function, the network communication function is used to transmit the type information of the device 20 to the device driver providing server 40 via the communication interface 4, and a request is made to the device driver providing server 40 to provide the device driver corresponding to the type information. The device driver providing server 40 searches for the device driver corresponding to the type information in response to the request, and transmits the same to the device communication interface apparatus 10. With the device driver acquisition function, the device driver is received from the device driver providing server 40 via the communication interface 4 and stored in the memory 3. The device driver acquisition function also reads and starts the device driver stored in the memory 3.

Thereafter, with the network communication function, a communication connection is established with the information processing server 30 on the communication network 50. The network address of the information processing server 30 has been stored in advance in the memory 3. There are a variety of conceivable methods for acquiring the network address, and these have been discussed above. The information processing server 30 and the device driver providing server 40 may be constituted by the same server.

The processor 2 next starts the device input and output function. With the device input and output function, depending on the device type, the following operations are performed.

In a case where the device 20 is an input device, a user inputs information using the device 20. By the device input and output function, the information input through the device 20 is obtained via the input and output interface 1 and device driver, and buffered in the memory 3. The input information buffered in the memory 3 is transmitted without any changes, i.e. as-is, via the communication interface 4 to the information processing server 30.

The information processing server 30 receives the information transmitted from the device communication interface apparatus 10 (i.e. information input from the device 20), executes predetermined information processing in accordance with the received information, and stores the result in the storage means.

Meanwhile, in a case where the device 20 is an output device, with the device input and output function, periodic requests are made to the information processing server 30 via the communication interface 4 for information processing result to be output to the output device 20. When the information processing server 30 receives such a request, if information processing result to be output to the output device is stored, the server 30 reads the result from the storage means and transmits the same to the device communication interface apparatus 10. By the device input and output function, the information processing result from the information processing server 30 is received via the communication interface 4, and stored in the memory 3. The information processing result stored in the memory 3 is output without any changes, i.e. as-is, via the device driver to the device 20. Thus, the information processing result from the server is output from the device 20.

Figure 2:
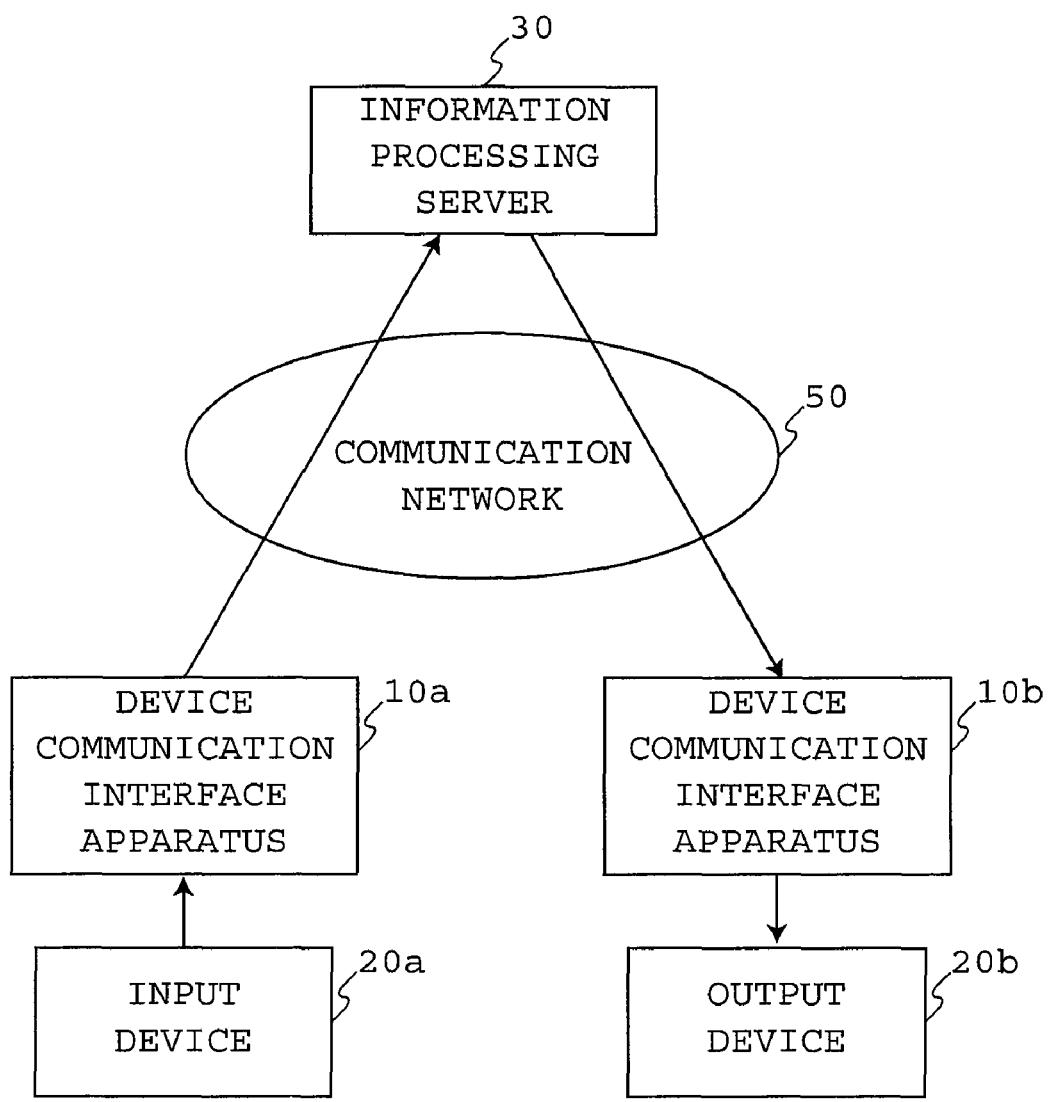
FIG. 2 is a diagram for explaining an application of the first embodiment of the present invention.

As shown in FIG. 2, a plurality of device communication interface apparatuses 10 may be used. Since the information processing server 30 is capable of finding out network identifiers (IP address, connection ID, and the like) of device communication interface apparatuses 10a and 10b, information processing result based on information input from the input device 20a can be output to the output device 20b if the network identifier information of an input-side device communication interface apparatus (input-side apparatus) 10a is associated with the network identifier information of an output-side device communication interface apparatus (output-side apparatus) 10b in the information processing server 30. When the input device 20a and output device 20b are located in the same place, a user is given same feeling as using a PC; alternatively, the input device 20a and output device 20b can easily be located in separate locations. The device communication interface apparatuses 10, 10a and 10b may have their own unique IDs in addition to network identifier information.

More specifically, the system of the information processing server 30 includes storage means for storing input-side network identifier information for identifying an input-side apparatus 10a and output-side network identifier information for identifying an output-side apparatus 10b as being associated with each other. A computer in the system (i.e. processing means) executes a step for associating input information received from the input-side apparatus 10a with the input-side network identifier information and storing the same in the storage means, and a step for performing information processing based on the input information and storing result of the information processing in the storage means. The computer also executes a step for reading from the storage means the output-side network identifier information associated with the input-side network identifier information associated with the input information, and a step for reading the information processing result from the storage means and transmitting the same to the output-side apparatus corresponding to the output-side network identifier information read from the storage means. The storage means of the information processing server 30 may store a unique ID of the input-side apparatus 10a and a unique ID of the output-side apparatus 10b as being associated with each other. FIG. 3 shows one example of a table that includes the correspondence between unique IDs of the input-side apparatuses 10a and unique IDs of the output-side apparatuses 10b. In the table shown in FIG. 3, the input-side apparatuses 10a are associated with the output-side apparatuses 10b one-to-one. The input-side apparatus 10a transmits input information together with the unique ID of the input-side apparatus 10a. The information processing server 30 reads from the storage means the unique ID of the output-side apparatus 10b associated with the unique ID of the input-side apparatus 10a. When the output-side apparatus 10b requests information processing result to be output to the output device 20, it transmits the unique ID of the output-side apparatus 10b; the information processing server 30 specifies the output-side apparatus 10b based on the received unique ID of the output-side apparatus 10b, and transmits the information processing result to the specified output-side apparatus 10b. Alternatively, the storage means may further store the unique ID of the device communication interface apparatus 10 and the network identifier as being associated with each other. If it does so, it is possible to transmit the information processing result to the output-side apparatus 10b by specifying the network identifier information of the output-side apparatus 10b further associated with the unique ID of the output-side apparatus 10b associated with the unique ID of the input-side apparatus 10a.

A table as shown in FIG. 3 is generated, for example, in the manner described below. First, the user uses a PC (not shown in the drawings) to log on to the information processing server 30, and then, as operated by the user, the PC requests the information processing server 30 to transmit setting screen data. The information processing server 30 transmits setting screen data in response to the request. The PC displays a setting screen based on the setting screen data. Upon user input, the PC transmits to the information processing server 30 the input information input on the setting screen indicating the correspondence between the input-side apparatus 10a and output-side apparatus 10b. Based on this input information, the information processing server 30 registers data indicating the correspondence between the input-side apparatus 10a and output-side apparatus 10b into a table as shown in FIG. 3.

(4) Effects by the Present Embodiment

In the embodiment thus explained above, a user does not need to prepare a computer body in order to utilize a computer. By preparing just the device communication interface apparatus(es) and a familiar device, a user can utilize a computer anywhere. From a private environment, a user can utilize a high performance computer realizing computing performance in a server side. In addition, it can be utilized without the conventional restriction that both an input device and output device must be located nearby the user.

Further, since device drivers for the connected devices are supplied from the server, various sorts of devices can be connected to the device communication interface apparatus and the device communication interface apparatus itself is not required a lot of resources.

Connectable devices are not limited to keyboards and monitor displays. Any input devices can be connected such as keyboards, mice, scanners, card readers, microphones, facsimile machines, and the like. Any output devices can be connected such as monitor displays, speakers, printers, facsimile machines, and the like. Alternatively, a display of a mobile terminal such as a portable telephone, PDA, or the like can be designated as an output device. Further, if a plurality of output-side apparatuses can be designated as output destinations for the predetermined information processing result, it is possible, for example, to connect a plurality of monitor displays as output devices, and to cause the plurality of monitor displays to simultaneously display the same screen. If a device communication interface apparatus is mounted inside a mobile terminal such as a portable telephone, PDA or the like, it is possible, for example, to connect a standard keyboard as an input device and a mobile terminal as an output device, and to cause a display in the mobile terminal to display information input from the keyboard.

Second Embodiment

In a second embodiment of the present invention, a user ID has been associated with a unique ID (or network identifier information) of the device communication interface apparatus 10, and only device communication interface apparatuses available to a given user are associated with each other, so that this user uses these device communication interface apparatuses.

FIG. 4 is a diagram showing one example of a table that includes correspondence between unique IDs of the device communication interface apparatuses 10 and user IDs of users permitted to use the device communication interface apparatuses 10 in the second embodiment. This table is stored in the storage means in the information processing server 30. In the table shown in FIG. 4, one or more user IDs is/are registered as being associated with the unique ID of the device communication interface apparatus 10.

For a given user, two device communication interface apparatuses 10 are selected from among a plurality of available device communication interface apparatuses 10 through referencing to the table shown in FIG. 4. One of the selected device communication interface apparatuses 10 is designated as an input-side apparatus 10a, and the other selected device communication interface apparatus 10 is designated as an output-side apparatus 10b. Thus, the correspondence between the input-side apparatus 10a and output-side apparatus 10b is established, and is registered in a table as shown in FIG. 3 as an association between the unique IDs.

In the second embodiment, a table as shown in FIG. 3 is generated, for example, in the following manner. First, a user uses a PC (not shown in the drawings) to log on to the information processing server 30, and then, as operated by the user, the PC requests the information processing server 30 to transmit setting screen data. The information processing server 30 transmits the setting screen data in response to the request. The setting screen data contain a list of one or more device communication interface apparatuses 10 available to the user; the list is transmitted by the information processing server 30 after referencing to a table as shown in FIG. 4. The PC displays a setting screen based on the setting screen data. In the setting screen, the list of the device communication interface apparatuses 10 available to the user is displayed. Upon user selection, the PC transmits to the information processing server 30 the selection information indicating the two device communication interface apparatuses 10 (one as the input-side apparatus 10a and the other as the output-side apparatus 10b) selected on the setting screen. Based on this selection information, the information processing server 30 registers into the table as shown in FIG. 3 the data indicating correspondence between the input-side apparatus 10a and output-side apparatus 10b. Thus, only device communication interface apparatuses 10 available to the user are associated with each other.

A table as shown in FIG. 4 is generated, for example, in the following manner. First, the user uses a PC (not shown in the drawings) to log on to the information processing server 30, and then as operated by the user, the PC requests the information processing server 30 to transmit registration screen data. The information processing server 30 transmits the registration screen data in response to the request. The PC displays a registration screen based on the registration screen data. Upon user input, the PC transmits to the information processing server 30 the input information indicating correspondence between the device communication interface apparatus 10 input on the registration screen and the user. Based on the input information, the information processing server 30 registers into the table as shown in FIG. 4 the data indicating correspondence between the device communication interface apparatus 10 and the user.

Other features and operations of the device communication interface apparatus 10 and the information processing server 30 in the second embodiment are not explained here because they are identical to those of the first embodiment.

As mentioned above, in the second embodiment, only the device communication interface apparatuses 10 available to a user are associated with each other, thereby preventing an unauthorized user from using the device communication interface apparatuses 10.

Third Embodiment

In a third embodiment of the present invention, an owner ID unique to an owner (or an administrator) of a device communication interface apparatus 10 is associated and registered with a unique ID (or network identifier information) of the device communication interface apparatus 10, and the owner registers users permitted to use the device 10.

FIG. 5 is a diagram showing one example of a table that includes correspondence among unique IDs of device communication interface apparatuses 10, owner IDs of owners of the apparatuses 10, and user IDs of users permitted to the device communication interface apparatuses 10. The owner ID may be an owner's user ID or an ID other than the user ID in the third embodiment.

In the same manner as in the second embodiment, for a given user, two device communication interface apparatuses 10 are selected from among the plurality of available device communication interface apparatuses 10 through referencing the table shown in FIG. 5. Thus, the correspondence between the input-side apparatus 10a and output-side apparatus 10b is established, and is registered into the table as shown in FIG. 3 as a association between the unique IDs.

In the third embodiment, a table as shown in FIG. 3 is generated in the same manner as the second embodiment by using the table of FIG. 5 in place of the table shown in FIG. 4.

A table as shown in FIG. 5 is generated, for example, in the following manner. First, the owner uses a PC (not shown in the drawings) by presenting the owner ID to log on to the information processing server 30, and as operated by the owner, the PC requests the information processing server 30 to transmit registration screen data. The information processing server 30 transmits the registration screen data in response to the request. The registration screen data contain a list of device communication interface apparatuses 10 where the owner can edit information of users permitted to use the apparatuses 10; the list is transmitted by the information processing server 30 after referencing to a table as shown in FIG. 5. The PC displays a registration screen based on the registration screen data. Upon owner input, the PC transmits to the information processing server 30 input information indicating the correspondence between the device communication interface apparatus 10 input on the registration screen and a target user. Based on the input information, the information processing server 30 registers into the table as shown in FIG. 4 the data indicating the correspondence between the device communication interface apparatus 10 and the target user.

Other features and operations of the device communication interface apparatus 10 and information processing server 30 in the third embodiment are not explained here because they are identical to those of the first embodiment.

As mentioned above, in the third embodiment, only device communication interface apparatuses 10 available to a user are associated with the user. Moreover, users permitted to use the device communication interface apparatuses 10 are registered by the owner (or the administrator) of the device communication interface apparatus 10, thereby preventing an unauthorized user from using the device communication interface apparatuses 10.

The above-described embodiments are merely illustrative preferred examples and should not be construed as limiting the invention. Therefore, the present invention can be implemented with a variety of variations and modifications, without departing from this technical concept and features inherent thereto.

For example, according to the above embodiments, in a case where the device 20 is an output device, by the device input and output function, a request for the information processing result to be output to the output device 20 is made to the information processing server 30. However, embodiments are not limited to such a configuration, and variations can be realized as follows: the device communication interface apparatus has its own network identifier information (e.g., IP address or the like) and server function (where a predetermined port is kept open), and the information processing server 30 transmits information processing result to the device communication interface apparatus (not in response to a request from the device communication interface apparatus, but to the predetermined port of the apparatus specified from the network identifier information). In this case, the device communication interface apparatus notifies its own network identifier information to the information processing server 30 of at the time of initial connection therewith, and the information processing server 30 stores the network identifier information in a storage device.

Alternatively, the device 20 may have a unique ID (i.e. identifier information) in order to use it in place of the device communication interface apparatus 10 unique ID. If it does so, when the device 20 is connected, the device communication interface apparatus 10 obtains the ID unique to the device 20 from the device 20, and transmits the ID with together in communication with the information processing server 30. Thus, user permission/non-permission can be set with respect to usage of the device 20, regardless of the device communication interface apparatus 10 to be used. Further, it is possible to use an advanced permission setting that a predetermined device cannot be used unless it is connected with a predetermined device communication interface apparatus 10.

Various other embodiments can be achieved by combining the above-described methods; for example, permission settings for an input device of a predetermined type are set based on the permission settings of the device communication interface apparatus 10, where for using an output device of a predetermined type, authorization to use both the device communication interface apparatus 10 and the output device is required.

What is claimed is:

1. A device communication interface apparatus comprising:
    a processor;
    an input and output interface configured to be connected with a device which includes first information;
    a communication interface configured to:
    (a) connect, via cable or wirelessly, to a communication network; and
    (b) communicate with a server on the communication network; and
    a memory device which stores a first device driver and instructions which when executed by the processor, cause the processor to:
    (a) after the device is connected to the input and output interface, obtain the first information of the device;
    (b) using the obtained first information, determine whether the stored first device driver corresponds to the device;
    (c) in response to the stored first device driver corresponding, to the device, start the first device driver;
    (d) in response to the device being a first type of device, transmit second information to the server, the second information being input via the input and output interface and the first device driver from the device; and
    (e) in response to the device being a second type of device, transmit, via the first device driver and the input and output interface, third information to the device, the third information being received via the communication interface from the server;
    wherein the instructions, when executed by the processor, cause the processor to attach identification information unique to the device onto information to be transmitted to the server, the identification information being obtained from the device.

2. The device communication interface apparatus of claim 1, wherein the instructions, when executed by the processor, cause the processor to, in response to the first device driver not corresponding to the device connected to the input and output interface, obtain a second device driver from the server via the communication interface.

3. A mobile terminal comprising:
    an input and output interface configured to be connected with a device;
    a communication interface configure to:
    (a) connect, via cable or wirelessly, to a communication network; and
    (b) communicate with a server on the communication network; and a memory device which stores a first device driver and instructions which when executed by the processor, cause the processor to;
    (a) after the device is connected to the input and output interface, obtain the first information of the device;
    (b) using the obtained first information, determine whether the stored first device driver corresponds to the device; a
    (c) response to the stored first device driver corresponding to the device, start the first device driver;
    (d) in response to the device being a first type of device, transmit second information to the server, the second information being input via the input and output interface and the first device driver from the device; and,
    (e) in response to the device being a second type of device, transmit, via the first device driver and the input and output interface, third information to the device, the third information being received via the communication interface from the server;
    wherein the instructions, when executed by the processor, cause the processor to attach identification information unique to the device onto information to be transmitted to the server, the identification information being obtained from the device.

4. The mobile terminal of claim 3, wherein the instructions, when executed by the processor, cause the processor to, in response to the first device driver not corresponding to the device connected to the input and output interface, obtain the device driver from a server on the communication network via the communication interface.

5. A mobile terminal comprising:
    an input device;
    an output device; and
    a device communication interface apparatus, having:
    (a) an input and output interface configured to be connected with the input device or the output device;
    (b) a communication interface configured to:
        (i) connect via cable or wirelessly, to a communication network; and
        (ii) communicate with a server on the communication network;
    (c) a memory device which stores a device driver and instructions which when executed by the processor, cause the processor to:
        (i) after the device is connected to the input and output interface, obtain the first information of the device;
        (ii) using the obtained first information, determine whether the stored first device driver corresponds to the device;
        (iii) in response to the stored first device driver corresponding to the device, start the first device driver;

(iv) in response to the device being a first type of device, transmit second
information to the server, the second information being input via the input and output interface and the first device driver from the device, and,
(v) in response to the device being a second type of device, transmit, via the first device driver and the input and output interface, third information to the device, the third information being received via the communication interface from the server;

wherein the instructions, when executed by the processor, cause the processor to attach identification information unique to the device onto information to be transmitted to the server, the identification information being obtained from the device.

6. The mobile terminal of claim 5, wherein the instructions, when executed by the processor, cause the processor to, in response to the first device driver not corresponding to the device connected to the input and output interface, obtain a second device driver from the server via the communication interface.

* * * * *